US010674701B2

(12) United States Patent
Kramer

(10) Patent No.: US 10,674,701 B2
(45) Date of Patent: Jun. 9, 2020

(54) AGRICULTURAL MAT AND ASSOCIATED SYSTEMS AND METHODS

(71) Applicant: Titan International, Inc., Quincy, IL (US)

(72) Inventor: Jeff Kramer, Des Moines, IA (US)

(73) Assignee: Titan International, Inc., Quincy, IL (US)

( * ) Notice: Subject to any disclaimer, the term of this patent is extended or adjusted under 35 U.S.C. 154(b) by 0 days.

(21) Appl. No.: 15/187,365

(22) Filed: Jun. 20, 2016

(65) Prior Publication Data
US 2016/0374307 A1 Dec. 29, 2016

Related U.S. Application Data

(60) Provisional application No. 62/182,246, filed on Jun. 19, 2015.

(51) Int. Cl.
*A01K 1/015* (2006.01)
*A01K 1/01* (2006.01)
(52) U.S. Cl.
CPC .......... *A01K 1/0151* (2013.01); *A01K 1/0103* (2013.01); *A01K 1/0157* (2013.01)
(58) Field of Classification Search
CPC .. A01K 1/0157; A01K 1/0103; A01K 1/0151; A01K 1/015
See application file for complete search history.

(56) References Cited

U.S. PATENT DOCUMENTS

| 687,086 A | 11/1901 | Upham |
|---|---|---|
| 729,923 A | 6/1903 | Ellis |
| 839,834 A | 1/1907 | Gray |
| 873,420 A | 12/1907 | Farmer |
| 1,401,788 A | 12/1921 | Kelleher |
| 1,421,818 A | 7/1922 | Oakley |
| 1,501,739 A | 7/1924 | Benedek |
| 1,510,647 A | 10/1924 | Bomar |
| 1,550,636 A | 8/1925 | Robinson |
| 1,577,608 A | 3/1926 | Brewer |
| 1,588,487 A | 6/1926 | Miller |
| 1,613,158 A | 1/1927 | Brewer |
| 1,756,380 A | 4/1930 | Osborn |
| 1,797,562 A | 3/1931 | Williams |
| 1,805,038 A | 5/1931 | Derr |
| 1,815,558 A | 7/1931 | Gammeter |
| 1,823,131 A | 9/1931 | Crockett |
| 1,827,127 A | 10/1931 | Weamer |
| 1,835,825 A | 12/1931 | Thierry |
| 1,861,389 A | 5/1932 | Grosjean |

(Continued)

FOREIGN PATENT DOCUMENTS

| CA | 2531200 A1 * | 3/2007 | ............ A01K 1/015 |
|---|---|---|---|
| DE | 2106097 A1 | 8/1972 | |

(Continued)

*Primary Examiner* — Magdalena Topolski
(74) *Attorney, Agent, or Firm* — Bejin Bieneman PLC

(57) ABSTRACT

An interlocking slat cover system with edge lugs disposed around a substantially planar mat secure the cover in place. Center lugs can also be disposed within openings on the mat to further prevent movement of the cover. The cover can be made of relatively soft rubber, and generally serves to prevent cover movement as well as injury and disease in the livestock.

19 Claims, 11 Drawing Sheets

(56) References Cited

U.S. PATENT DOCUMENTS

| | | |
|---|---|---|
| 1,925,734 A | 9/1933 | Reiss |
| 1,926,303 A | 9/1933 | Paulus |
| 1,939,293 A | 12/1933 | Cavanagh |
| 1,957,732 A | 5/1934 | Rowe |
| 1,964,348 A | 6/1934 | Gammeter |
| 1,974,280 A | 9/1934 | Jones |
| 1,983,671 A | 12/1934 | Kohler |
| 1,985,484 A | 12/1934 | Clark |
| 1,988,825 A | 1/1935 | Barker |
| 1,988,828 A | 1/1935 | Bianco |
| 2,032,832 A | 3/1935 | Blair et al. |
| 1,999,441 A | 4/1935 | Clark |
| 2,057,171 A | 10/1936 | Van Der Pyl |
| 2,069,753 A | 2/1937 | Emhardt |
| 2,077,901 A | 4/1937 | Russon |
| 2,081,334 A | 5/1937 | Kickenbush |
| 2,083,201 A | 6/1937 | Poppe |
| 2,110,909 A | 3/1938 | Henderson |
| 2,140,902 A | 12/1938 | Fischer |
| 2,144,683 A | 1/1939 | McClung et al. |
| 2,175,941 A | 10/1939 | Keays |
| 2,187,140 A | 1/1940 | Faris |
| 2,205,802 A | 6/1940 | Scheidemantel et al. |
| 2,217,821 A | 10/1940 | Shiner |
| 2,248,811 A | 7/1941 | Cotterman |
| 2,254,210 A | 9/1941 | Cunnington |
| 2,274,468 A | 2/1942 | Bell |
| 2,279,944 A | 4/1942 | Hendry |
| 2,284,494 A | 5/1942 | Oakley |
| 2,293,751 A | 8/1942 | May |
| 2,308,587 A | 1/1943 | Connor |
| 2,325,414 A | 7/1943 | McChesney et al. |
| 2,327,624 A | 8/1943 | Denman |
| 2,340,392 A | 2/1944 | Lefcourt |
| 2,429,486 A | 10/1947 | Reinhardt |
| 2,436,139 A | 2/1948 | Clark |
| 2,465,725 A | 3/1949 | Herzmark |
| 2,512,310 A | 6/1950 | Corson |
| 2,531,659 A | 11/1950 | Watson |
| 2,567,951 A | 9/1951 | Lewis |
| 2,586,612 A | 2/1952 | Caldwell |
| 2,635,307 A | 4/1953 | Wood |
| 2,665,664 A | 1/1954 | Benjamin |
| 2,667,654 A | 2/1954 | Peterson |
| 2,696,030 A | 12/1954 | Grohsgal |
| 2,720,861 A | 10/1955 | Stroup |
| 2,721,818 A | 10/1955 | Dolnick |
| 2,800,688 A | 7/1957 | Label |
| 2,807,564 A | 9/1957 | Mitchell |
| 2,807,842 A | 10/1957 | Galkin |
| 2,820,454 A | 1/1958 | Wright |
| 2,844,696 A | 7/1958 | Custer, Jr. |
| 2,847,731 A | 8/1958 | Hollander |
| 2,848,976 A | 8/1958 | Combs |
| 2,885,748 A | 5/1959 | Wood |
| 2,905,971 A | 9/1959 | Valentini |
| 2,908,027 A | 10/1959 | McClung |
| 2,915,785 A | 12/1959 | Valentini |
| 2,974,322 A | 3/1961 | Norris |
| 2,975,089 A | 3/1961 | Hargreaves |
| 3,005,209 A | 10/1961 | Timmons |
| 3,015,136 A | 1/1962 | Doe |
| 3,020,562 A | 2/1962 | Reynolds |
| 3,027,967 A | 4/1962 | Silver |
| 3,034,140 A | 5/1962 | Reynolds |
| 3,066,646 A | 12/1962 | Bramley |
| 3,078,490 A | 2/1963 | Etcher |
| 3,147,575 A | 9/1964 | Schnabel |
| 3,156,957 A | 11/1964 | Moeckel |
| 3,178,333 A | 4/1965 | Gabrielsen et al. |
| 3,234,577 A | 2/1966 | Mann |
| 3,242,034 A | 3/1966 | Trager |
| 3,242,509 A | 3/1966 | Nissen |
| 3,262,134 A | 7/1966 | Bramble |
| 3,267,187 A | 8/1966 | Slosberg et al. |
| 3,299,885 A | 1/1967 | Wessel |
| 3,300,275 A | 1/1967 | Lorman |
| 3,307,317 A | 3/1967 | Lynn |
| 3,341,866 A | 9/1967 | Wright |
| 3,408,663 A | 11/1968 | Buning |
| 3,434,715 A | 3/1969 | Brantingham et al. |
| 3,455,279 A | 7/1969 | Krevit |
| 3,461,844 A | 8/1969 | Harrison |
| 3,488,684 A | 1/1970 | Wrightson |
| 3,699,926 A | 10/1972 | Stockl |
| 3,726,255 A * | 4/1973 | Marr ............... A01K 1/0157 119/480 |
| 3,760,769 A | 9/1973 | Erfeling |
| 3,771,495 A | 11/1973 | Stevenson |
| 3,824,960 A | 7/1974 | Kaltenbock |
| 3,846,856 A | 11/1974 | Tu |
| 3,869,128 A | 3/1975 | Ohashi |
| 3,911,520 A | 10/1975 | Tupper |
| 3,953,631 A | 4/1976 | Gordon |
| 3,978,263 A | 8/1976 | Wellensiek |
| 4,012,544 A | 3/1977 | Richards |
| 4,027,355 A | 6/1977 | Mead et al. |
| 4,047,259 A | 9/1977 | Lotis |
| 4,059,865 A | 11/1977 | Schmidt |
| 4,129,097 A | 12/1978 | Schwartzkopff |
| 4,147,828 A | 4/1979 | Heckel et al. |
| 4,176,622 A | 12/1979 | Wolf |
| 4,201,817 A | 5/1980 | Duncan, Jr. |
| 4,211,185 A | 7/1980 | Karlsson |
| 4,226,064 A * | 10/1980 | Kraayenhof ............ A01K 1/015 404/35 |
| 4,247,756 A | 1/1981 | Cucinotta et al. |
| 4,287,693 A | 9/1981 | Collette |
| D261,183 S | 10/1981 | Bunger |
| D261,184 S | 10/1981 | Bunger |
| D261,185 S | 10/1981 | Bunger |
| D263,428 S | 3/1982 | Bartscher |
| D263,511 S | 3/1982 | Bartscher |
| 4,329,981 A | 5/1982 | Dungl |
| 4,333,981 A | 6/1982 | Winfield et al. |
| 4,338,369 A | 7/1982 | Foenard |
| D266,608 S | 10/1982 | Bartscher |
| D266,609 S | 10/1982 | Bartscher |
| D266,610 S | 10/1982 | Bartscher |
| 4,362,128 A | 12/1982 | Downey |
| RE31,345 E | 8/1983 | Schwartzkopff |
| 4,430,960 A | 2/1984 | Nagel et al. |
| 4,435,451 A | 3/1984 | Neubert |
| 4,468,910 A | 9/1984 | Morrison |
| 4,478,901 A | 10/1984 | Dickens |
| 4,502,415 A | 3/1985 | Schwarzkopff |
| 4,530,870 A | 7/1985 | Brazier |
| 4,581,273 A | 4/1986 | Lang |
| 4,689,258 A | 8/1987 | Slosberg et al. |
| 4,741,065 A | 5/1988 | Parkins |
| 4,762,741 A | 8/1988 | Hedley |
| 4,873,040 A | 10/1989 | Lang |
| 4,886,692 A | 12/1989 | Kerr et al. |
| 4,967,057 A | 10/1990 | Bayless et al. |
| D322,907 S | 1/1992 | Raburn |
| 5,154,868 A | 10/1992 | Heckel et al. |
| D332,509 S | 1/1993 | Kovatch |
| D332,510 S | 1/1993 | Kovatch |
| D332,673 S | 1/1993 | Kovatch |
| 5,198,278 A | 3/1993 | Sumimoto et al. |
| 5,226,384 A | 7/1993 | Jordan |
| 5,264,824 A | 11/1993 | Hour |
| D343,259 S | 1/1994 | Kovatch |
| D343,260 S | 1/1994 | Kovatch |
| 5,305,565 A | 4/1994 | Nagahama et al. |
| 5,350,478 A | 9/1994 | Bojstrup et al. |
| 5,351,458 A | 10/1994 | Lehe |
| 5,363,806 A | 11/1994 | Van Gilst |
| 5,428,857 A | 6/1995 | Murray |
| 5,461,748 A | 10/1995 | Koiduka |
| 5,477,654 A | 12/1995 | Weelink |
| 5,524,317 A | 6/1996 | Nagahama et al. |
| 5,529,825 A | 6/1996 | Sutherland |
| 5,614,292 A | 3/1997 | Saylor |

(56) References Cited

U.S. PATENT DOCUMENTS

| | | |
|---|---|---|
| 5,637,247 A | 6/1997 | Flynn, Jr. |
| 5,653,195 A | 8/1997 | Young |
| D383,253 S | 9/1997 | Semenuk |
| 5,701,846 A | 12/1997 | Parker |
| 5,724,916 A | 3/1998 | Brodie et al. |
| 5,724,917 A | 3/1998 | Dodson et al. |
| 5,749,314 A | 5/1998 | Pelham et al. |
| 5,811,165 A | 9/1998 | Andreen |
| 5,834,086 A | 11/1998 | Burke, III et al. |
| 5,866,234 A | 2/1999 | Vaughan et al. |
| 5,876,825 A | 3/1999 | Daley |
| 5,902,662 A | 5/1999 | Kerr |
| 5,967,092 A | 10/1999 | Pederson |
| 5,968,631 A | 10/1999 | Kerr |
| 5,970,919 A | 10/1999 | Mooney |
| 5,989,695 A | 11/1999 | Fuller et al. |
| 6,036,902 A | 3/2000 | Wang |
| 6,050,223 A | 4/2000 | Harris |
| 6,051,811 A | 4/2000 | Hardison |
| 6,053,126 A | 4/2000 | Klinger |
| 6,058,883 A | 5/2000 | Robins |
| 6,061,980 A | 5/2000 | Poiencot |
| 6,079,366 A | 6/2000 | Telleen |
| D433,165 S | 10/2000 | Moreau et al. |
| 6,152,077 A | 11/2000 | Bristow |
| 6,158,183 A | 12/2000 | Snell |
| 6,159,576 A | 12/2000 | Rockwell |
| 6,173,677 B1 | 1/2001 | Inatomi et al. |
| 6,187,245 B1 | 2/2001 | Hedley |
| 6,210,620 B1 | 4/2001 | Wilke |
| 6,220,205 B1 | 4/2001 | Massie |
| 6,224,804 B1 | 5/2001 | Schwonke et al. |
| 6,251,321 B1 | 6/2001 | Kuhl et al. |
| 6,269,768 B1 | 8/2001 | Zarman |
| 629,468 A1 | 9/2001 | Liebich |
| 6,294,768 B1 | 9/2001 | Liebich |
| 6,296,919 B1 | 10/2001 | Rockwell, Jr. et al. |
| 6,332,293 B1 | 12/2001 | Kerr |
| 6,340,514 B1 | 1/2002 | Kerr |
| 6,357,388 B1 | 3/2002 | Holtrop et al. |
| 6,391,381 B1 | 5/2002 | Stroppiana |
| 6,420,015 B1 | 7/2002 | Nord |
| 6,436,384 B2 | 8/2002 | Santoiemmo |
| 6,536,376 B2 | 3/2003 | Brown |
| 6,545,113 B2 | 4/2003 | Stroppiana |
| 6,578,324 B2 | 6/2003 | Kessler et al. |
| 6,589,631 B1 | 7/2003 | Suzuki et al. |
| 6,591,560 B2 | 7/2003 | Burke, III et al. |
| 6,599,615 B2 | 7/2003 | Burke |
| 6,623,840 B2 | 9/2003 | Hainbach |
| D481,898 S | 11/2003 | Mendis |
| 6,649,237 B1 | 11/2003 | Pahl et al. |
| 6,663,537 B2 | 12/2003 | McCoy |
| 6,663,936 B2 | 12/2003 | Brazier |
| 6,663,937 B2 | 12/2003 | Ullman et al. |
| 6,689,239 B1 | 2/2004 | Grubic |
| 6,689,443 B2 | 2/2004 | Kobayashi et al. |
| 6,709,728 B2 | 3/2004 | Kerr |
| 6,709,732 B1 | 3/2004 | Graab et al. |
| 6,754,996 B2 | 6/2004 | Komoriya |
| 6,783,829 B2 | 8/2004 | Arena |
| 6,796,096 B1 | 9/2004 | Heath |
| 6,808,588 B1 | 10/2004 | Streeton et al. |
| D497,759 S | 11/2004 | Mendis |
| 6,833,039 B2 | 12/2004 | Andersen et al. |
| 6,861,118 B2 | 3/2005 | Kobayashi et al. |
| 6,878,430 B2 | 4/2005 | Milewski et al. |
| 6,921,502 B1 | 7/2005 | Nord et al. |
| 6,935,273 B2 | 8/2005 | Throndsen |
| 6,935,382 B2 | 8/2005 | Buckley |
| 6,946,620 B2 | 9/2005 | Bavett |
| 6,966,275 B2 | 11/2005 | Whitehill |
| 6,991,842 B2 | 1/2006 | Hurwitz |
| 7,185,604 B2 | 3/2007 | Holte |
| 7,211,314 B2 | 5/2007 | Nevison |
| 7,225,756 B2 | 6/2007 | Greenfield |
| 7,234,415 B2 | 6/2007 | Dietz |
| 7,353,776 B2 | 4/2008 | Mooney |
| 7,392,765 B2 | 7/2008 | Lingmann |
| 7,404,995 B2 | 7/2008 | Fleming et al. |
| 7,452,433 B2 | 11/2008 | Shin et al. |
| 7,470,458 B1 | 12/2008 | Loo |
| 7,485,071 B2 | 2/2009 | Edwards |
| 7,540,684 B1 | 6/2009 | Lukasik |
| 7,566,374 B2 | 7/2009 | Brazier et al. |
| 7,811,371 B2 | 10/2010 | Gustafsson et al. |
| 7,832,044 B2 | 11/2010 | Kessler et al. |
| 8,033,249 B1 | 10/2011 | Cook et al. |
| 8,413,392 B2 | 4/2013 | Van Der Velden |
| 8,464,486 B1 | 6/2013 | Elliott et al. |
| 8,510,878 B2 | 8/2013 | Wang |
| D692,622 S | 10/2013 | MacKenney |
| 9,049,841 B2 | 6/2015 | Stevens et al. |
| 9,228,299 B2 | 1/2016 | Brown |
| 2002/0045021 A1 | 4/2002 | Brown et al. |
| 2003/0091831 A1 | 5/2003 | Mickey |
| 2003/0129354 A1 | 7/2003 | Burke |
| 2003/0138595 A1 | 7/2003 | Hedley |
| 2003/0192484 A1 | 10/2003 | Folkema |
| 2004/0069924 A1 | 4/2004 | Lemieux et al. |
| 2004/0109977 A1 | 6/2004 | Wildstein et al. |
| 2004/0137212 A1 | 7/2004 | Ochoa et al. |
| 2004/0163603 A1 | 8/2004 | Newton |
| 2004/0200425 A1 | 10/2004 | Paquette |
| 2004/0255870 A1* | 12/2004 | McGregor ........... A01K 1/0151 119/528 |
| 2005/0031827 A1 | 2/2005 | Lang |
| 2005/0106976 A1 | 5/2005 | Laner |
| 2005/0155173 A1 | 7/2005 | Ramsey et al. |
| 2005/0163972 A1 | 7/2005 | Monney |
| 2005/0223636 A1 | 10/2005 | Schmitt et al. |
| 2006/0188689 A1 | 8/2006 | Hedley |
| 2006/0254529 A1 | 11/2006 | Padett |
| 2006/0290023 A1 | 12/2006 | Suseelan |
| 2007/0037461 A1 | 2/2007 | Stroppiana |
| 2007/0059095 A1 | 3/2007 | Hines |
| 2007/0128429 A1 | 6/2007 | Murphy |
| 2007/0131666 A1 | 6/2007 | Gregg et al. |
| 2007/0207286 A1 | 9/2007 | Craig et al. |
| 2007/0275827 A1 | 11/2007 | Glaser |
| 2007/0287002 A1 | 12/2007 | Cabados |
| 2008/0023869 A1 | 1/2008 | Stroppiana |
| 2008/0078020 A1 | 4/2008 | Wright |
| 2008/0145636 A1 | 6/2008 | Ko |
| 2008/0199662 A1 | 8/2008 | Gross |
| 2008/0216228 A1 | 9/2008 | Bonanno |
| 2008/0282463 A1 | 11/2008 | Tong |
| 2009/0013472 A1 | 1/2009 | Koffler et al. |
| 2009/0068423 A1 | 3/2009 | Coletta |
| 2009/0110867 A1 | 4/2009 | Feng Shen |
| 2009/0158646 A1 | 6/2009 | Moore, Jr. et al. |
| 2009/0217884 A1 | 9/2009 | Reuver et al. |
| 2009/0282733 A1 | 11/2009 | Moore, Jr. et al. |
| 2009/0297811 A1 | 12/2009 | Hutchinson |
| 2010/0016134 A1 | 1/2010 | Reese |
| 2010/0162642 A1 | 7/2010 | Allard et al. |
| 2010/0173124 A1 | 7/2010 | Liu |
| 2011/0143083 A1 | 6/2011 | Scorgie |
| 2011/0208235 A1 | 8/2011 | Sternbach |
| 2011/0244173 A1 | 10/2011 | Yang |
| 2012/0240336 A1 | 9/2012 | Dandapure et al. |
| 2012/0252954 A1 | 10/2012 | Grun et al. |
| 2012/0260862 A1 | 10/2012 | Alexander |
| 2012/0328833 A1 | 12/2012 | Chao |
| 2013/0086740 A1 | 4/2013 | Thompson et al. |
| 2013/0143455 A1 | 6/2013 | Peterson et al. |
| 2013/0149547 A1 | 6/2013 | Grun et al. |
| 2013/0150518 A1 | 6/2013 | Grun |
| 2013/0152830 A1 | 6/2013 | Robertson |
| 2013/0251963 A1 | 9/2013 | Dandapure et al. |
| 2014/0069337 A1 | 3/2014 | Dunford |
| 2014/0231190 A1 | 9/2014 | Landers |
| 2014/0259399 A1 | 9/2014 | Tsai |
| 2014/0261190 A1 | 9/2014 | Landers |

(56) References Cited

U.S. PATENT DOCUMENTS

| | | |
|---|---|---|
| 2014/0272854 A1 | 9/2014 | Morrow |
| 2014/0374056 A1 | 12/2014 | Choi et al. |
| 2015/0090184 A1 | 4/2015 | Wasuck et al. |
| 2015/0118445 A1 | 4/2015 | Gmitro et al. |
| 2015/0237823 A1 | 8/2015 | Schmitt et al. |
| 2015/0251375 A1 | 9/2015 | Lin |
| 2015/0224980 A1 | 11/2015 | Van Raam et al. |
| 2015/0334980 A1 | 11/2015 | Van Raam et al. |
| 2016/0030799 A1 | 2/2016 | Sutherland |
| 2016/0057971 A1 | 3/2016 | Jenkins et al. |
| 2016/0059065 A1 | 3/2016 | Fasullo |

FOREIGN PATENT DOCUMENTS

| | | | |
|---|---|---|---|
| DE | 3012855 A1 * | 10/1981 | ........... A01K 1/0151 |
| DE | 202013002816 U1 * | 6/2013 | ........... A01K 1/0151 |
| EP | 0081736 | 6/1983 | |
| EP | 0435050 | 7/1991 | |
| EP | 2181585 | 5/2010 | |
| GB | 2457830 | 3/2010 | |
| NL | 8003066 A | 1/1982 | |

\* cited by examiner

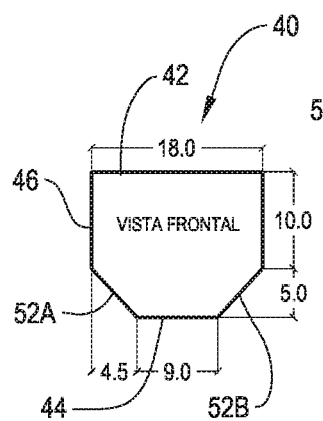
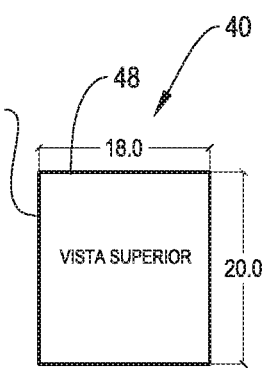
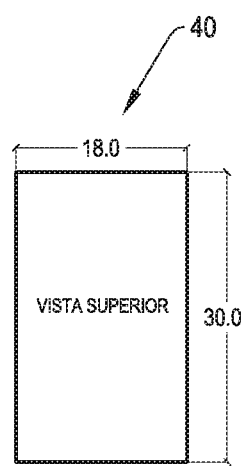
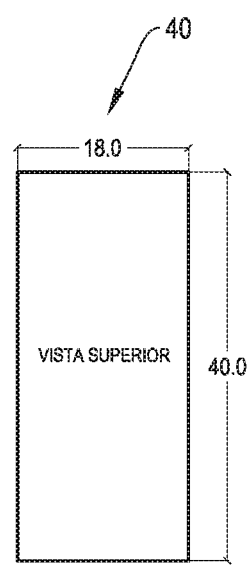
Fig. 5A   Fig. 5B   Fig. 5C   Fig. 5D
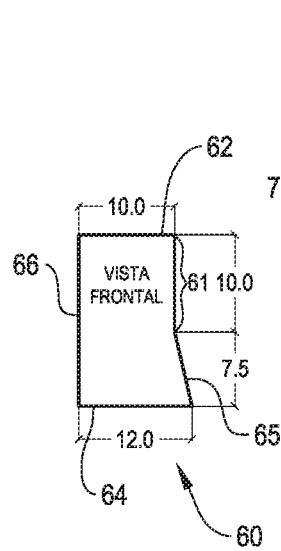
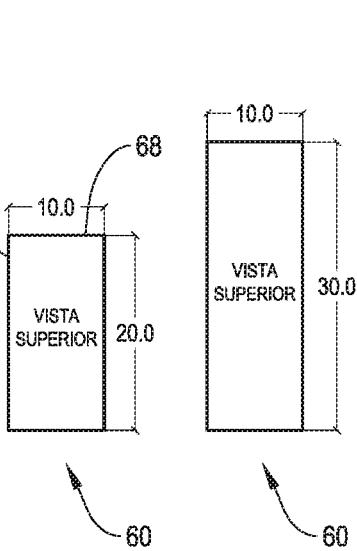
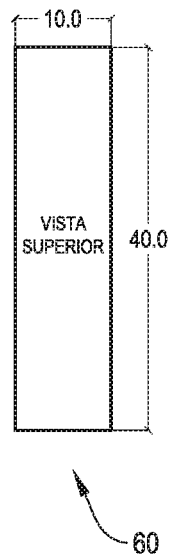
*SLAT PARA GANADO 6" x 4" TAPONES DE ORIFICIO DERECHO-IZQUIERDO*
Fig. 5E   Fig. 5F   Fig. 5G   Fig. 5H

AGRICULTURAL MAT AND ASSOCIATED SYSTEMS AND METHODS

CROSS-REFERENCE TO RELATED APPLICATION(S)

This application claims priority to U.S. Provisional Application No. 62/182,246 filed Jun. 19, 2015 and entitled "Improved Agricultural Mat And Associated Systems And Methods," which is hereby incorporated by reference in its entirety under 35 U.S.C. § 119(e).

TECHNICAL FIELD

The disclosure relates to a device, systems and methods relating to a mat or cover for use in agricultural applications. More specifically, the disclosed embodiments relate to an improved mat or slat cover for use with livestock in conjunction with slats. In exemplary embodiments, the devices, systems and methods relate to an interlocking mat or slat cover for placement above concrete slats.

BACKGROUND

The disclosure relates to mats for placement on livestock slats. In the livestock industry, slats, frequently made of concrete, are placed in livestock buildings, and more specifically are placed in indoor livestock pens and containment areas. Typically, the slats have gaps defined therein that allow for feces and other waste liquids (such as from animal watering systems, etc.) to pass through to an area beneath the slats, thereby reducing or eliminating the collection or accumulation of such feces and waste liquids in the pen. This helps to reduce contact of the livestock with such feces and waste liquids, thereby reducing illness and injury resulting from the presence of such liquids. The use of slats makes it possible to retain livestock in a building or enclosure for an extended period of time, including, for example, during the winter months. And keeping livestock in an indoor environment during cold weather can enhance the efficient growth of the livestock, as the livestock will gain weight faster in the warmer indoor environment.

These slats, being made of concrete or other solid, rigid material, can cause additional strain on the joints and feet of the livestock. Previous attempts to address this strain have involved the placement of mats over the slats. however, these prior art slats have a tendency to move on the slats, which can cause them to be displaced, and to accumulate bacteria and other unwanted materials between the mats and the slats. Further, prior art slats have typically utilized thin, hard coverings of less than an inch with a durometer of more than 70, and are frequently held in place by bolts or other metal fasteners, thereby contributing to the development of joint problems in the animals, and diseases when the mats are pulled up and exposed to accumulated bacteria. Further, certain prior art covers also require the use of a sledgehammer to install. The various embodiments of the slat cover described herein, including the associated systems and methods, address the deficiencies of the prior art.

There is a need in the art for improved devices, systems and methods for covering livestock slats.

BRIEF SUMMARY

Discussed herein are various embodiments of an improved slat cover or mat, as well as associated systems and methods for its use. For brevity, these embodiments may be described as a "slat cover", or in relation to a single modality, though that is not intended to limit the scope of the disclosure in any way.

In Example 1, a livestock slat cover comprises a substantially rectangular mat comprising first and second sides, a plurality of edges and at least one opening; at least one center lug disposed on the second side adjacent to the opening on the second side of the mat; and at least one edge lug disposed at one edge of the mat.

Example 2 relates to the slat cover according to Example 1, wherein the edge lug further comprises a first and second end, wherein the first end is fixedly attached to the mat and the second end further comprises a protrusion.

Example 3 relates to the slat cover according to Example 1, wherein the mat is comprised of rubber.

Example 4 relates to the slat cover of Example 3, wherein the mat is at least one inch thick.

Example 5 relates to the slat cover of Example 1, further comprising a plurality of buttons disposed on the first side of the mat.

Example 6 relates to the slat cover of Example 5, wherein the plurality of buttons further comprise lower and upper buttons.

Example 7 relates to the slat cover of Example 2, further comprising at least one edge gap.

Example 8 relates to the slat cover of Example 7, wherein the edge lug is configured such that the gap and protrusion allow multiple covers to be interlocked with one another between slats.

In one Example, A slat cover for use with livestock, including a substantially planar mat including first and second sides, a plurality of edges and at least one opening, and at least one edge lug, where the at least one edge lug is configured to interlock with an adjacent mat. Implementations may include one or more of the following features. The slat cover where the at least one edge lug includes a first and second end, where the first end is fixedly attached to the mat and the second end including a protrusion. The slat cover further including at least one center lug disposed on the second side adjacent to the at least one opening, and The slat cover where the mat is included of a single piece of rubber. The slat cover where the rubber has a type A durometer of between 60 and 70. The slat cover where the mat is included of rubber. The slat cover including a plurality of buttons disposed on the first side of the mat. The slat cover where the plurality of buttons further include lower and upper buttons. The slat cover further including at least one edge gap. The slat cover where the edge lug is configured such that the edge gap and protrusion allow multiple covers to be interlocked with one another between slats. The single-piece slat cover further including at least one center lug disposed to the at least one opening. The single-piece slat cover where the at least one edge lug includes an angled protrusion. The single-piece slat cover where the protrusion is angled to contour around a non-vertical portion of the underside of the slat. The single-piece slat cover where the at least one edge lug is configured to interlock with a second mat edge lug. The single-piece slat cover further including a lip disposed around the opening. The system where the first and second planar mats further include an edge gap. The system where the first and second edge lugs are configured to interlock by sliding through the edge gap. The system where the first and second edge lugs each include an angled protrusion. The system further including at least one center lug.

In one Example, A single-piece slat cover to be disposed over a slat, including a substantially planar mat, at least one opening, and at least one edge lug. Implementations may include one or more of the following features. The single-piece slat cover further including at least one center lug disposed to the at least one opening. The single-piece slat cover where the at least one edge lug includes an angled protrusion. The single-piece slat cover where the protrusion is angled to contour around a non-vertical portion of the underside of the slat. The single-piece slat cover where the at least one edge lug is configured to interlock with a second mat edge lug. The single-piece slat cover further including a lip disposed around the opening. The system where the first and second planar mats further include an edge gap. The system where the first and second edge lugs are configured to interlock by sliding through the edge gap. The system where the first and second edge lugs each include an angled protrusion. The system further including at least one center lug.

In one Example, An interlocking slat cover system, including a first planar mat including at least one first mat edge lug, and a second planar mat including at least one second mat edge lug, where the first planar mat and second planar mat are configured to be interlocked in a slat opening to secure the first mat and second mat in place. Implementations may include one or more of the following features. The system where the first and second planar mats further include an edge gap. The system where the first and second edge lugs are configured to interlock by sliding through the edge gap. The system where the first and second edge lugs each include an angled protrusion. The system further including at least one center lug.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 5A is a front view of a center lug, according to an exemplary embodiment.

FIG. 5B is a top view of a center lug, according to an exemplary embodiment.

FIG. 5C is a top view of a center lug, according to another exemplary embodiment.

FIG. 5D is a top view of an edge lug, according to yet another exemplary embodiment.

FIG. 5E is a front view of an edge lug, according to an exemplary embodiment.

FIG. 5F is a top view of an edge lug, according to an exemplary embodiment.

FIG. 5G is a top view of an edge lug, according to another exemplary embodiment.

FIG. 5H is a top view of an edge lug, according to yet another exemplary embodiment.

DETAILED DESCRIPTION

Livestock, including but not limited to cattle, swine, and sheep, are frequently contained in relatively high population environments. In these environments, the owners of the livestock must address the animal waste that is generated by these dense populations. One system that has been developed is the use of livestock slats, which are typically formed from concrete and contain substantially rectangular openings occurring at regular intervals.

Disclosed herein are various devices, systems and methods relating to the covering of livestock slats. In exemplary embodiments, these mats or slat covers are generally rectangular and planar, and have a plurality of openings, with center lugs and edge lugs disposed on the underside adjacent to the openings and edges, respectively. These mats or covers are generally designed to be secured in place over a slat, for instance a concrete slat, by way of these lugs. These mats are for use with livestock, and after being secured by the lugs, these mats or covers are configured to stay in a stationary position, that is: the mats are configured to not move despite the considerable force applied to the mats by the movement of livestock.

Accordingly, in certain implementations the edge lugs of one mat are configured to interlock with the edge lugs of a second mat. That is, the pairs of edge lugs are disposed adjacently so that friction prevents the movement of both mats on the underlying slats. In certain implementations, the mat has a first side and a second side, with buttons for improved traction disposed on the first side. In various implementations, the center and edge lugs extend from the second side, these lugs being configured to slide and lock in place when several mats are used together. In further embodiments, a plurality of lug gaps are provided such that two mats can be interlocked adjacent to one another, as is provided below.

Figure 1:
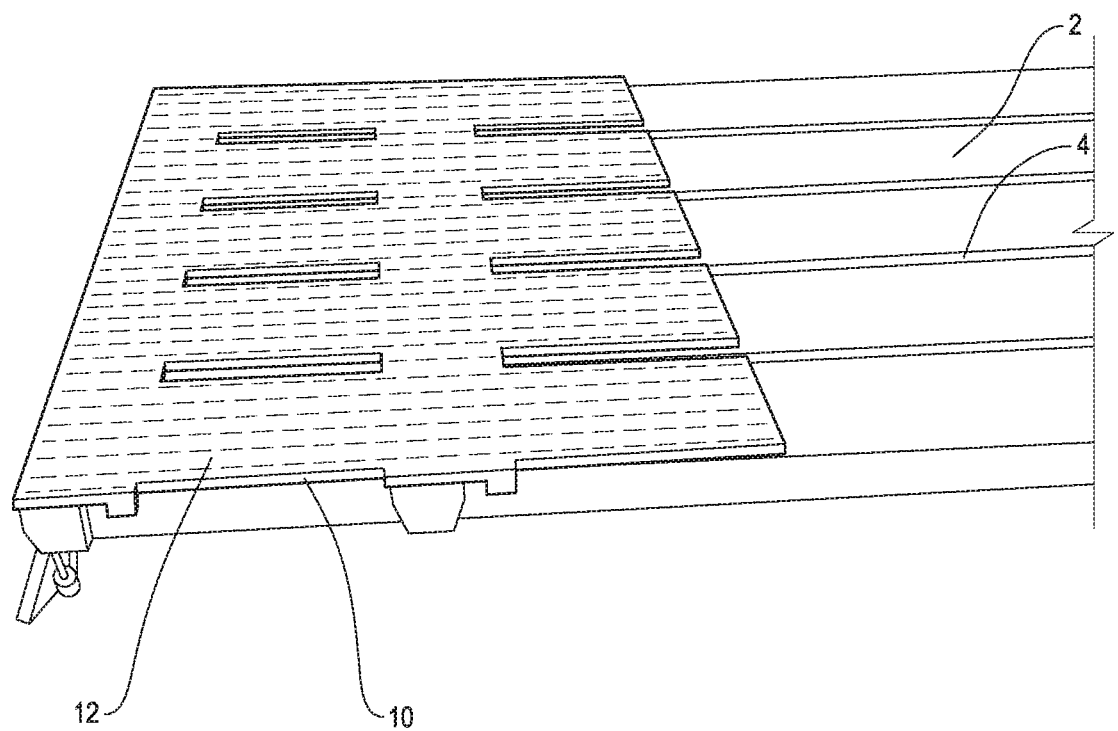
FIG. 1 is a perspective view of a partial slat cover over a slat, according to an exemplary embodiment.

Turning to the drawings in greater detail, a perspective view of a slat 2 having a partial interlocking cover 10 according to one embodiment is shown in FIG. 1. As best shown in the implementation of FIG. 1, a typical slat 2 has a plurality of openings 4, and a portion of a cover 10 having a plurality of corresponding openings 20, 22, and edge lugs 60A, 60B, as will be discussed herein. It is understood that the livestock are able to stand on these slats and generate waste which then falls or otherwise travels through the openings 4 and into a collection area below (not shown) for removal or disposal.

Exemplary embodiments of the presently-disclosed interlocking slat cover 10 reduce movement, prevent injury and disease in livestock, and are easy to install, as they require no additional hardware to be installed or held in place. In exemplary embodiments, a modular system of covers is provided, such that the individual covers can be placed sequentially and secured into place relative to one another using an adjacent lug configuration. The provided adjacent lug configuration provides for ease of installation and greater slat cover stability against being displaced and the other problems with the prior art.

In certain implementations, the mat is a rubber mat. In certain implementations, the rubber is a natural and synthetic blend. Other materials may be used. In exemplary embodiments, the mat is more than an inch thick, such as 1.05". In certain implementations, the mat has a type A durometer between 50-80, or between 60-70. In further implementations, a durometer of 62-68 is utilized. In yet further embodiments, rubber of a durometer between 64-66 is used, though it is understood that other rubbers and materials can be used. These implementations are softer than typical prior art covers, and therefore can further reduce the stress and wear on livestock. It is further understood that in certain implementations each mat or slat cover is formed from a single piece of molded rubber.

Figure 2:
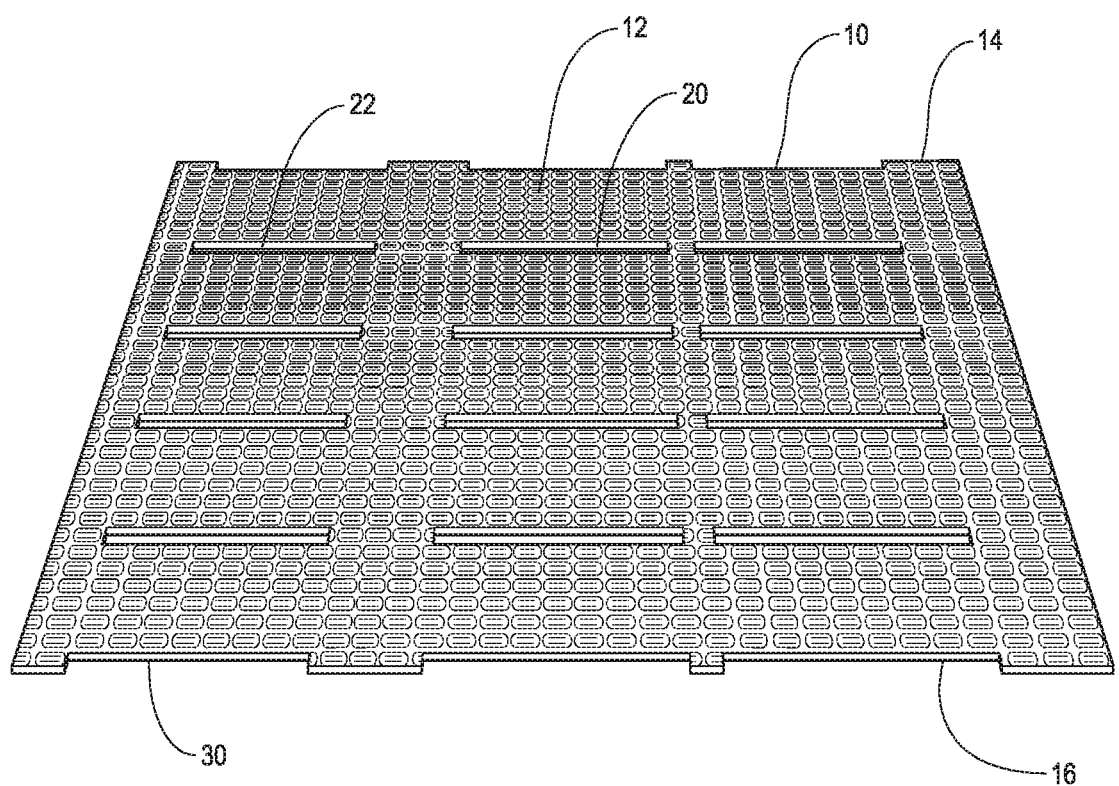
FIG. 2 is another perspective view of a slat cover, according to an exemplary embodiment.

FIG. 2 depicts a perspective overview of an exemplary embodiment of the slat cover 10. Exemplary embodiments of the slat cover 10 comprise a generally rectangular, planar mat 12 having top 14 and bottom 16 sides, and further comprising a plurality of openings 20, 22 configured to align with the openings in the underlying slat (shown in FIG. 1) so as to allow for the passage of waste through the openings 20 in the mat 12 and slat 4. In exemplary embodiments, the slat cover 10 has a plurality of protrusions or buttons 30 on the top side, discussed in detail in relation to FIG. 8.

In exemplary embodiments, the slat cover 10 is sized such that two covers are placed on a single slat. For example, an exemplary slat may be 4'×12', and each slat cover is sized at 4'×6'. It is understood that various species of livestock have specific slat configurations, and various manufacturers also have different specific slat configurations, and the cover 10 can be adapted to address each set of dimensions and opening arrangements.

Figure 3A:
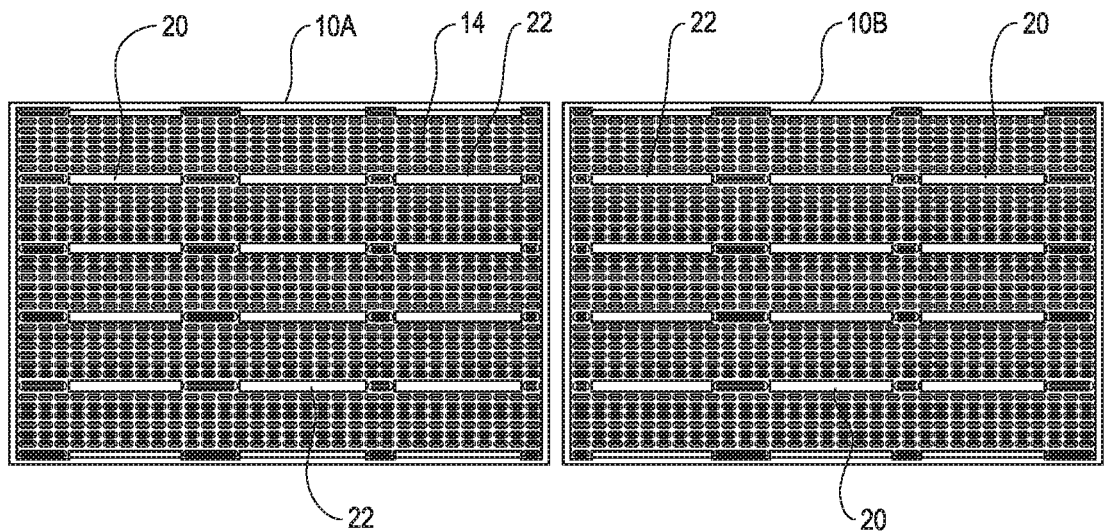
FIG. 3A is a top view of first and second slat covers, according to an exemplary embodiment.
Figure 3B:
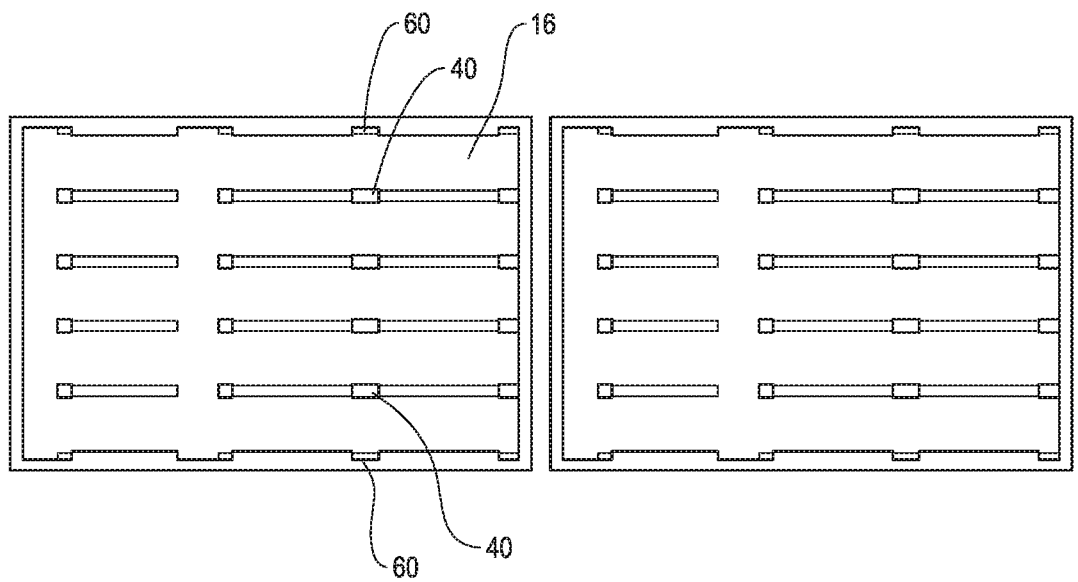
FIG. 3B is a bottom view of the first and second slat covers of FIG. 3A.
Figure 7:
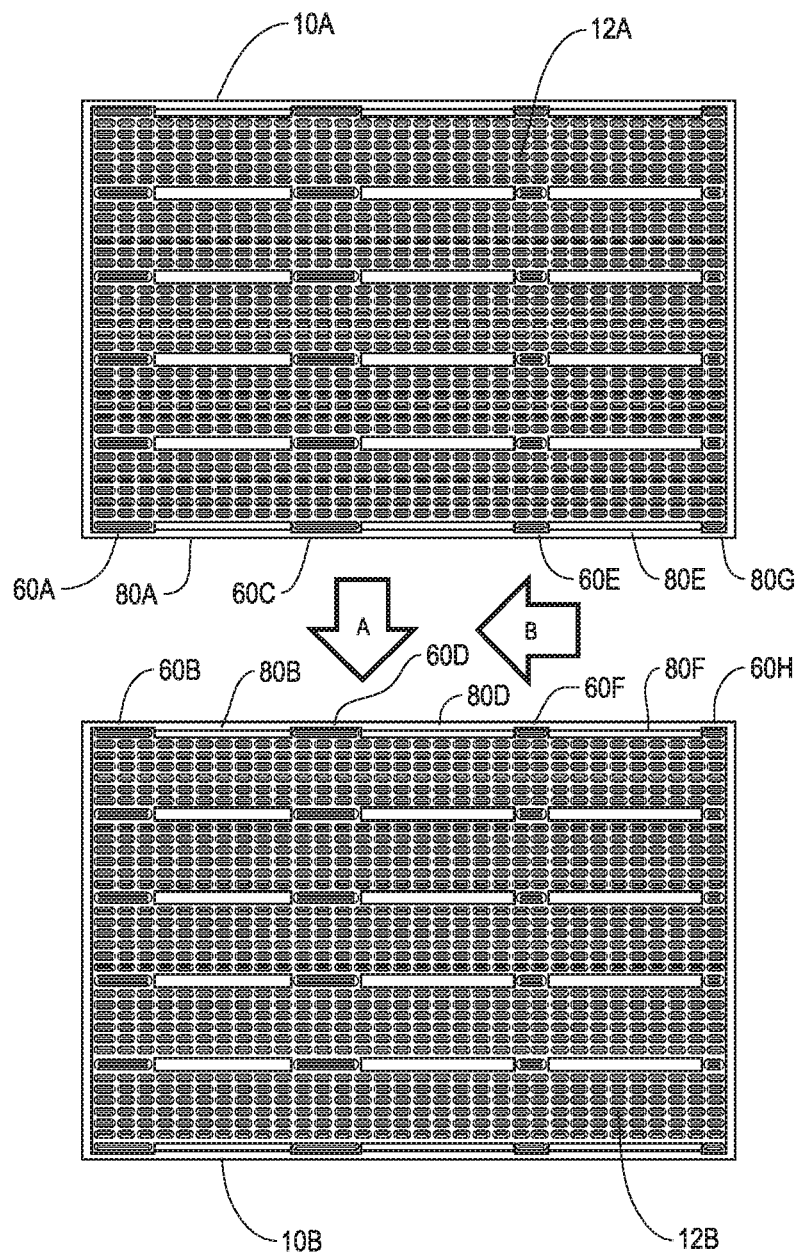
FIG. 7 is a top view of the placement according to the embodiment of FIGS. 6A-B.

By way of example, a first slat cover 10A depicted in FIG. 3A is joined with a second slat cover 10B (as best shown in FIG. 7) so as to cover the width of an entire slat. FIG. 3A depicts a top view of the first 10A and second 10B slat covers, while FIG. 3B depicts a bottom view of the same slat covers 10A, 10B. Other configurations are of course possible.

Figure 10:
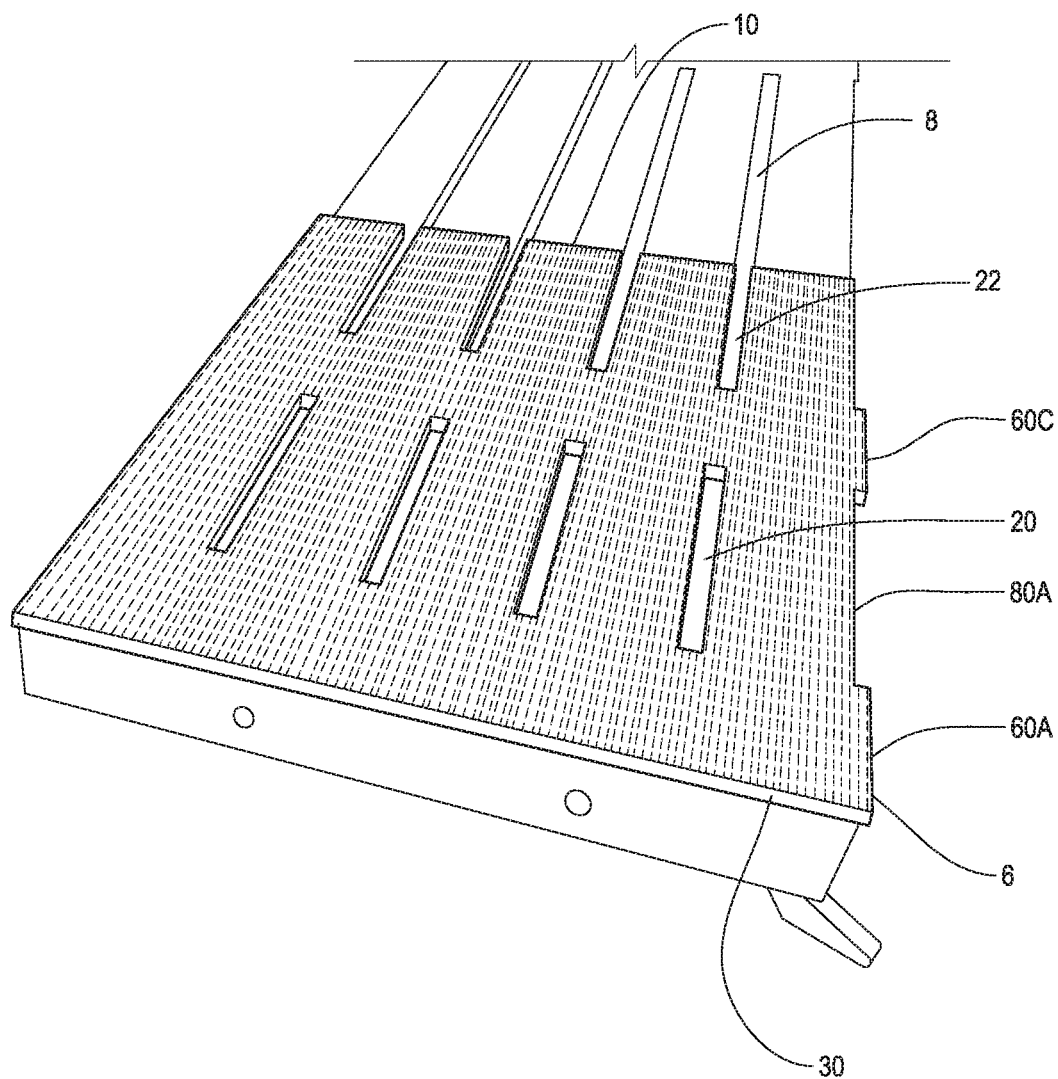
FIG. 10 is a further perspective view of a partial slat cover placed on a slat, according to an exemplary embodiment.

As will be apparent to one of skill in the art from the implementations of FIGS. 3A-B, in certain configurations the first cover 10A and second cover 10B will be paired and adapted to the underlying slat, depending on the exact shape of the slat and its openings (as is also shown in FIGS. 1 and 10). Accordingly, the various components of the cover 10 may vary in size and placement, such as placement and width of the various openings 20, 22 and the width of the lugs (discussed in relation to FIG. 5A-H).

Figure 4:
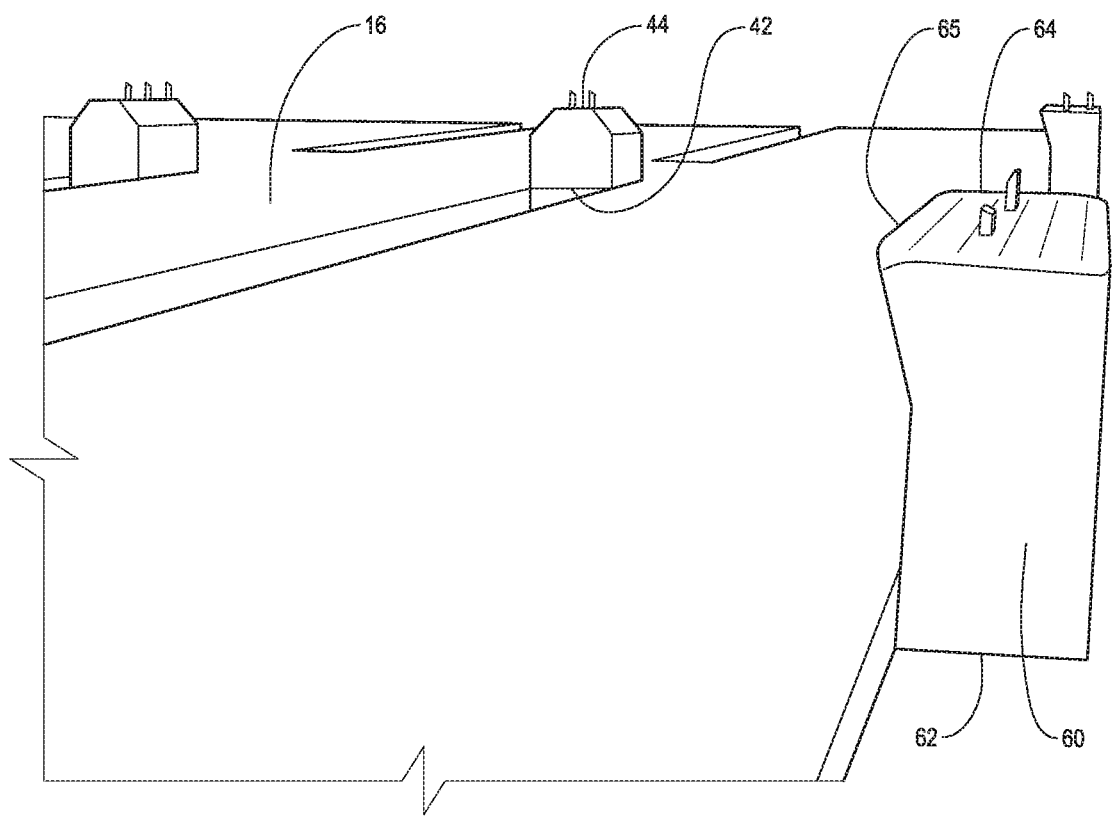
FIG. 4 is a perspective underside view of a slat cover, showing the edge and center lugs, according to an exemplary embodiment.

Exemplary embodiments of the slat cover 10 have various lugs used to secure the mats. These can be center lugs 40 and edge lugs 60, which protrude from the bottom 16 of the slat cover 10 adjacent to the openings 20, 22, as shown in FIGS. 3B-4. These lugs are of substantial thickness to be relatively rigid, that is, when fitted in a slat opening or between slats, the lugs are resistant to bending or twisting movement relative to the mat. Accordingly, the various lugs 40, 60 protrude in a substantially perpendicular direction from the bottom 16 of the mat. The center lugs 40 have a first end 42 which is fixedly attached or otherwise materially connected to or integral with the mat 12 and a second end 44 which extends into the slat opening (shown in FIGS. 1 and 6A) so as to hold the slat cover 10 in place, as is shown in detail greater in relation to FIG. 4.

FIGS. 5A-H depict front and top view schematics of several implementations of the center 40 and edge 60 lugs. In certain embodiments, the lugs are made of rubber or other material, and, in the case of the center lugs 40, are sized so as to abut against at least two faces of the slat opening (shown at 4A and 4B in FIGS. 6A-B).

As is shown in the implementation of FIGS. 5A-D, the center lugs 40 can be a variety of heights 46, lengths 48 and widths 50, so as to be adapted to fit within the slat openings, thereby helping to keep the cover in place. Further, the lugs 40 are adapted such that they don't fill the slat opening and thus they allow the waste to pass through the mat openings 20, 22 and slat openings 4, as would be apparent to one of skill in the art. In certain embodiments, the center lugs 40 have a tapered portion 52A, 52B at the second end 44 for ease of insertion into the slat openings 4.

Figure 6A:
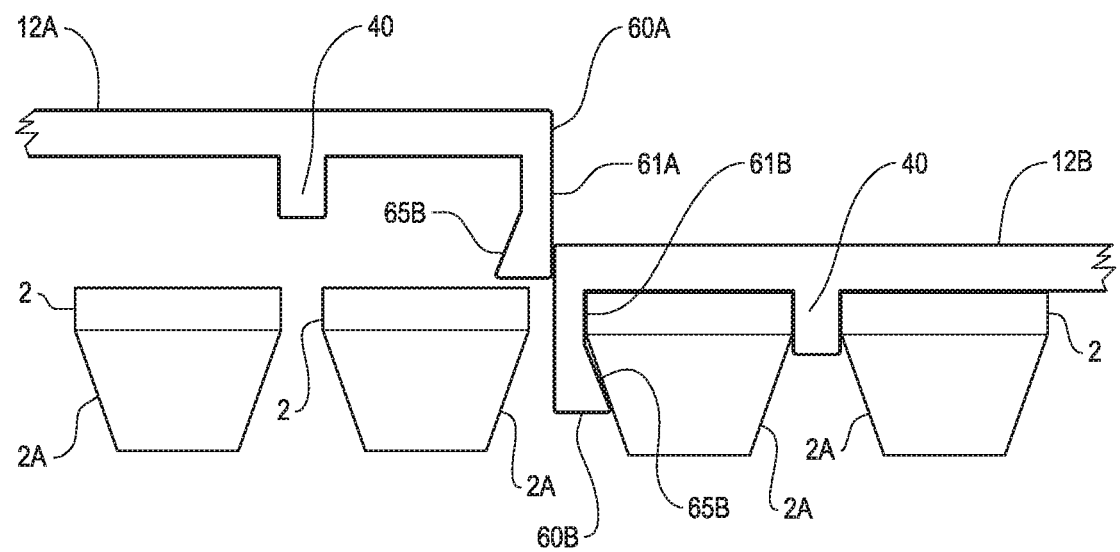
FIG. 6A is a end-long view of the placement of a second slat cover adjacent to a first slat cover, according to an exemplary embodiment.
Figure 6B:
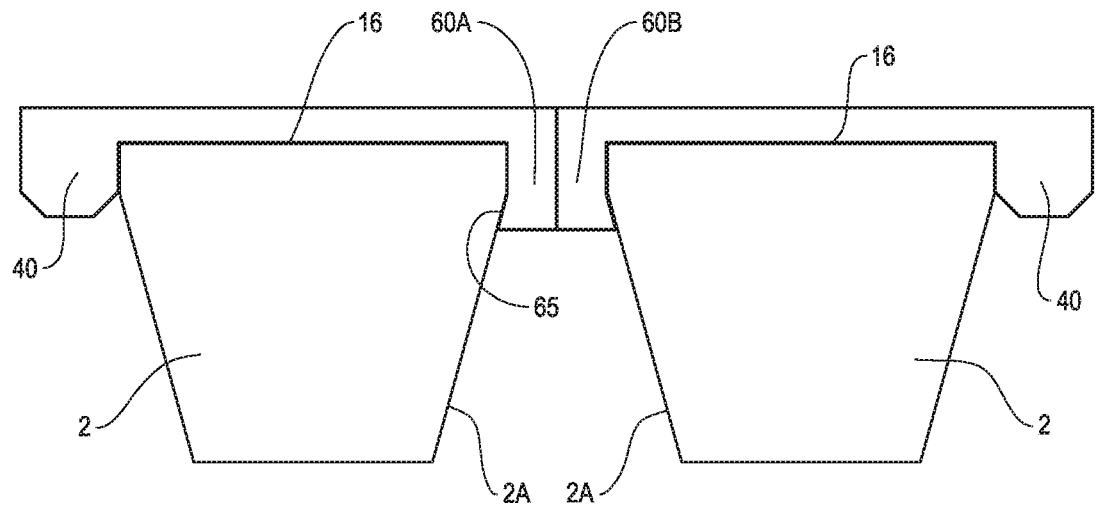
FIG. 6B is a close-up end-long view of the embodiment of FIG. 6A after placement.

FIG. 5E-H several implementations of the edge lug 60, which has a generally rectangular body 61, a first end 62 which is fixedly attached or otherwise materially connected to or integral with the underside 16 of the mat 12 and a second end 64 which extends into the opening between two slats. The edge lugs 60 have can be a variety of heights 66, lengths 68 and widths 70. As is shown in FIG. 5E, in these implementations the second end 64 has a protrusion 65, which in certain embodiments is tapered or angled so as to be adapted to extend beyond the body 61 and contour around the non-vertical portion 2A of the slat 2 (as is best shown in FIGS. 6A-B). It is understood that the dimensions of the lugs 40, 60 can be any known dimensions to allow for use of the cover embodiments herein with any known livestock slats.

As shown in the implementations of FIGS. 6A-7, the slat cover serves to be secured to the slat. As best shown in FIG. 6A, in certain implementations, the protrusions 65B of the side lugs 60A prevent the placement of a second cover 12A immediately adjacent to a first cover 12B. As shown the implementations of FIGS. 6A-7, when a second mat 12B is placed above the desired location—next to the first mat 12A such that the edge lugs are in alignment—the edge lugs 60B, 60D, 60F, 60H cannot be inserted directly into the slat opening 80 from above because the edge lugs 60A, 60C, 60E, 60G of the first mat 12A cannot fit into the slat opening while positioned directly adjacent to the edge lugs 60B, 60D, 60F, 60H of the second mat 12B. That is, because of the width of the protrusions 65A, 65B on each edge lug, a second edge lug 60A cannot be inserted into a slat opening while the corresponding edge lug 60B on the previously placed mat is already positioned in the slat opening at the same location along the length of the slat opening.

In exemplary embodiments as best shown in FIG. 7, the edge lugs 60A, 60C, 60E, 60G extend from the edge of a first mat 12A while edge lugs 60B, 60D, 60F, 60H extend from the edge of a second mat 12B that is intended to be positioned adjacent to the first mat 12A. Note that the edge lugs 60A, 60C, 60E, 60G of the first mat 12A correspond to the edge lugs 60B, 60D, 60F, 60H of the second mat 12B such that when they are positioned correctly next to each other on a slat, the edge lugs 60A, 60C, 60E, 60G will be positioned against edge lugs 60B, 60D, 60F, 60H, respectively.

In the implementation of FIG. 7, there are gaps 80A, 80C, 80E between the edge lugs 60A, 60C, 60E, 60G of the first mat 12A and corresponding gaps 80B, 80D, 80F between the edge lugs 60B, 60D, 60F, 60H of the second mat 12B. When the mats 12A, 12B are brought into the final adjacent configuration, the pairs of these gaps 80A, 80B are also positioned adjacent to one another so as to form an opening corresponding to a typical slat opening 20 or 22. Other configurations are possible.

As is shown in FIGS. 7A-8C, in exemplary embodiments, when a first 10A and second 10B slat cover are placed on adjacent slats, it is typically done sequentially, with first one mat (such as the second mat 12B) being placed on the slat at its desired location and then another mat (such as the first mat 12A) being placed adjacent to the second mat 12B.

As such, the first mat 12A must be first positioned next to the second mat 12B in an offset position such that the edge lugs 60A, 60C, 60E, 60G of the first mat 12A can be positioned into the slat opening in the gaps 80B, 80D, 80F of the second mat 12B, and then the first mat 12A can be slid alongside the second mat 12B until the two mats 12A, 12B are in alignment with one another (reference arrow B). By sliding the covers 12A, 12B into alignment, the abutting edge lugs 60A, 60B are brought into contact with one another such that the outer surfaces 72A, 72B are flush with one another, as is shown in FIGS. 8B-C.

Figure 8A:
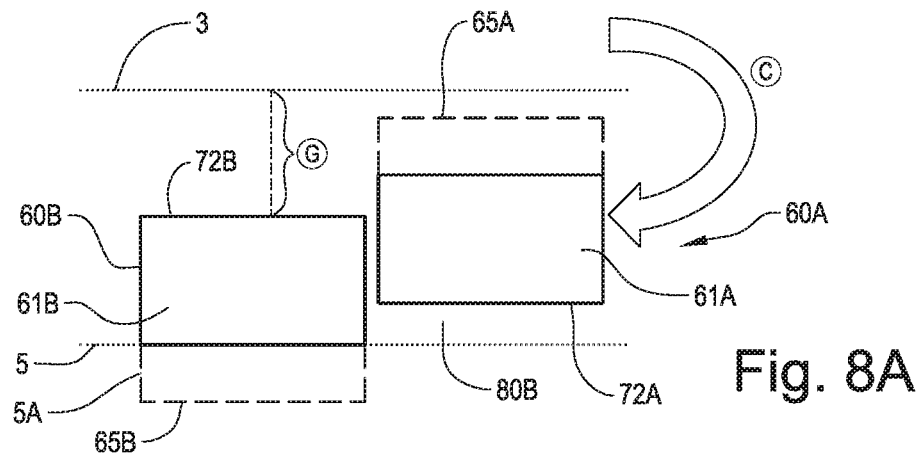
FIG. 8A is a detailed top view of the relationship between the edge lugs initial during placement, according to an exemplary embodiment.
Figure 8B:
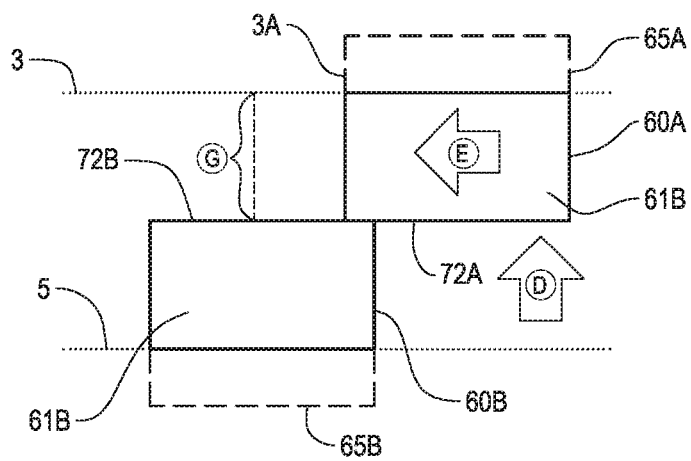
FIG. 8B is a detailed top view of the relationship between the edge lugs of adjacent covers being brought into alignment, according to the embodiment of FIG. 8A.
Figure 8C:
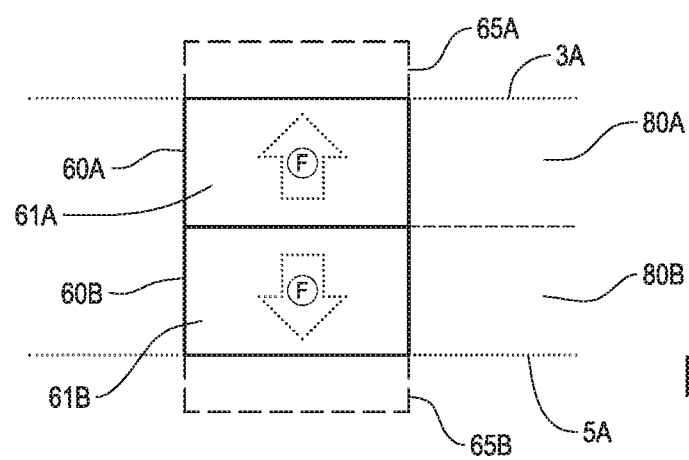
FIG. 8C is a detailed top view of the relationship between the edge lugs of adjacent covers after being urged into alignment, according to the embodiment of FIG. 8A.

FIGS. 8A-8C provide a close-up, top view of the placement of the edge lugs of two covers. As is shown in FIG. 8A, in exemplary embodiments, after a first edge lug 60B has been placed between a first 3 and second 5 slat, the protrusion 65B extends below 5A the edge of the supporting slat 5 and into the non-vertical recessed region (shown at 2A in FIG. 6A), so as to leave sufficient space (designated by reference letter G) between the outer surface 72B and the adjacent slat 3 so as to accommodate the body 61A of the second edge lug 60A, but not the protrusion 65A. Accordingly, the space between the adjoining slats 3, 5, including the gap 80B adjacent to the lug 60B is of sufficient size so as to accommodate the placement of a second lug 60A including the protrusion 65A, as is shown by reference letter C.

In FIG. 8B, following placement into the space between the slats 3, 5, the edge lug 60A may then be urged into position against the slat 3 (reference arrow D) such that the protrusion extends below 3A the face of the slat 3 such that the body 61A is substantially flush against the slat 3. The flush lug 60A can be subsequently urged into place adjacent to the placed lug 60B into the space G, as is shown by reference arrow E.

As is shown in FIG. 8C, this abutment results in the two edge lugs 60A, 60B serving to press against one another (reference letters F), thereby holding the angled protrusion 65A in place on the underside, non-vertical portion of the slat 3A, 5A (as also shown at 2A in FIG. 6A), thereby securing both slat covers in a stationary position which is resistant to being pulled up or otherwise disturbed by livestock.

Figure 9A:
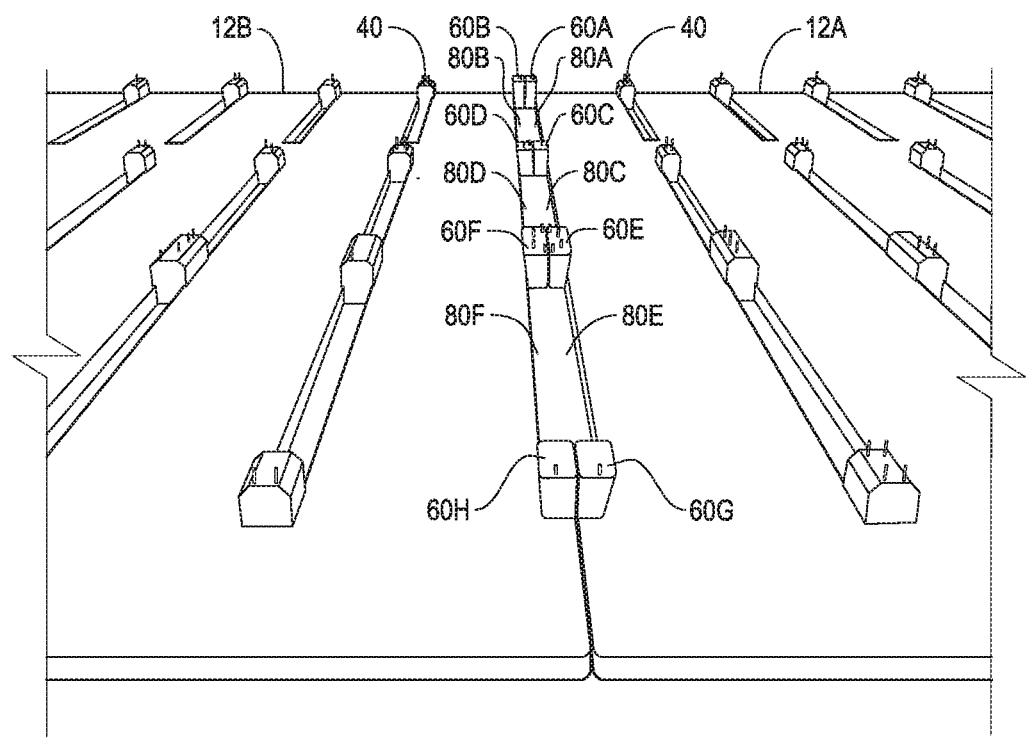
FIG. 9A is a perspective view of the underside of two slat covers adjacent to one another, according to an exemplary embodiment.
Figure 9B:
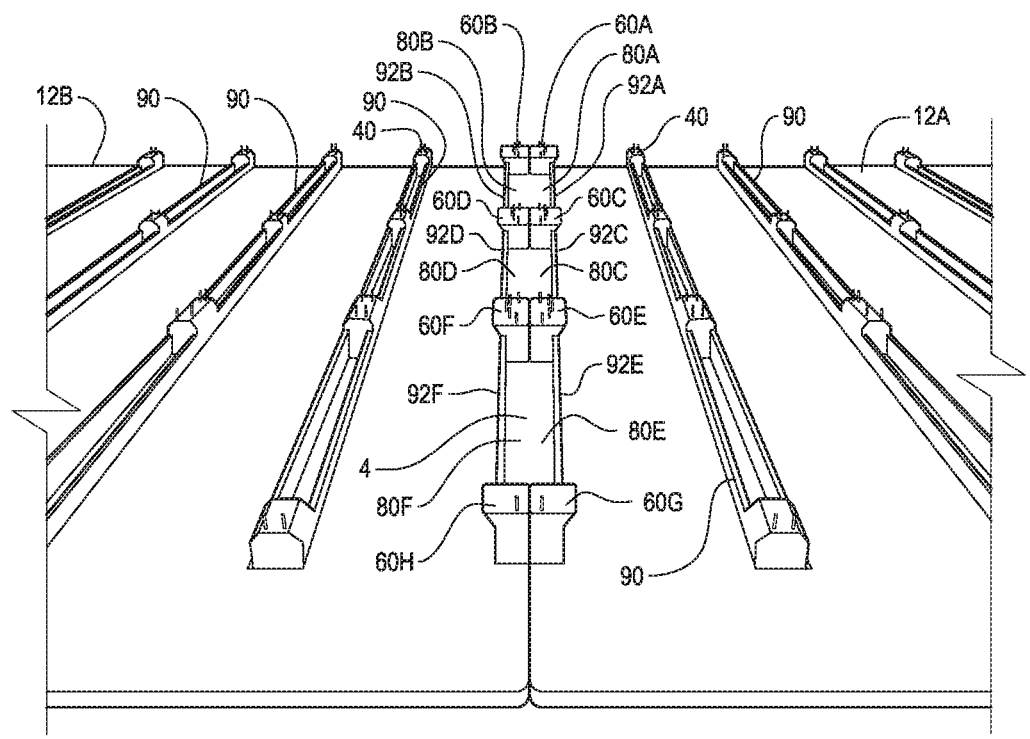
FIG. 9B is a perspective view of the underside of two slat covers adjacent to one another, according to an alternate embodiment having an opening lip.

FIG. 9A depicts a perspective view of the underside of two adjacent mats 12A, 12B including a plurality of edge lugs 60A, 60B, 60C, 60D, 60E, 60F, 60G, 60H, a plurality of gaps 80A, 80B, 80C, 80D, 80E, 80F, and center lugs 40. In FIG. 9B, a lip 90 is disposed about the underside of the mats so as to be around the openings 4 in the slats and contiguous with the center lugs 40. Another lip or lips 92A, 92B, 92C, 92D, 92E, 92F can be disposed between the edge lugs 60A, 60B, 60C, 60D, 60E, 60F, 60G, 60H, around the gaps 80A, 80B, 80C, 80D, 80E, 80F, again to surround the vertical portion of the slat within the openings. In these implementations, the lips 90, 92 serve to prevent feces, disease, and other contaminants from collecting in the slats. It is understood that concrete is relatively porous, and that a rubber coating can prevent these contaminants from collecting in the concrete of the slats 2.

FIG. 10 depicts a further view of a portion of a cover 10 placed on a slat 2 and having a plurality of edge lugs 60A, 60C and a gap 80A, as well as openings 20, 22 adapted to fit the underlying slat openings 6, 8.

Figure 11:
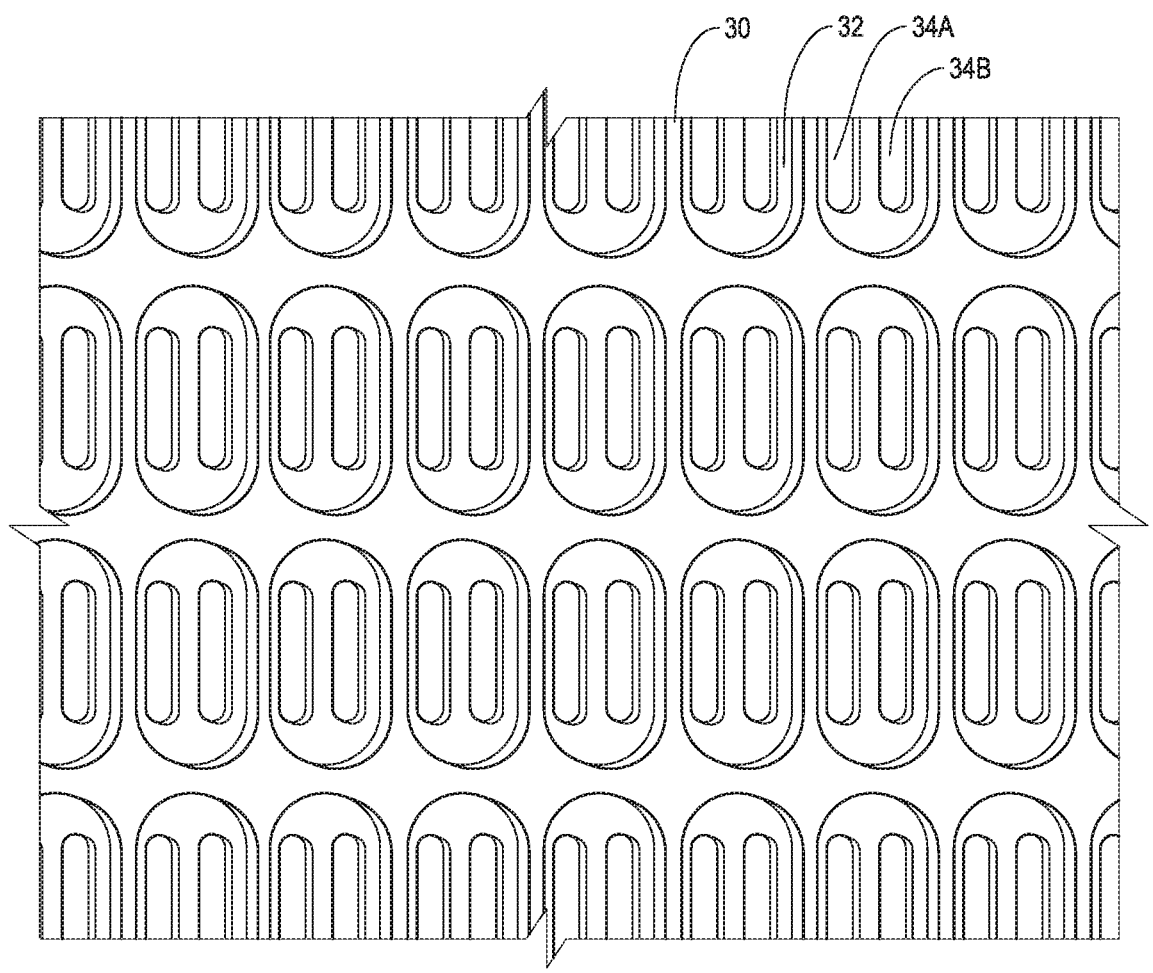
FIG. 11 depicts a close-up view of the top surface of a slat cover showing an embodiment having a plurality of buttons.

As is also shown in FIG. 11, in certain implementations the top surface 14 of the slat cover further comprises a plurality of buttons 30. These buttons 30 can have lower 32 and upper 34 buttons, such that in certain implementations more than one of the upper buttons 34A, 34B may be mounted on top of a single lower button. In certain implementations, the lower protrusions can extend approximately 0.2" off of the mat surface and the upper protrusions can extend a further 0.1", for a total protrusion of approximately 0.3". Other configurations are of course possible and would be apparent to the skilled artisan.

Although the disclosure has been described with reference to preferred embodiments, persons skilled in the art will recognize that changes may be made in form and detail without departing from the spirit and scope of the disclosed apparatus, systems and methods.

What is claimed is:

1. An interlocking slat cover for use with adjacent livestock slats having at least one opening disposed therebetween, the interlocking slat cover comprising:
   a. a first planar mat constructed and arranged to cover at least a portion of a first of the adjacent livestock slats, the first mat comprising:
      i. a top side;
      ii. a bottom side;
      iii. a plurality of edges and at least one elongate opening disposed therein;
      iv. a plurality center lugs constructed and arranged to be disposed in the openings of the first of the adjacent slats;
      v. at least one first mat edge gap; and
      vi. at least one first mat edge lug comprising a first angled protrusion,
   wherein the first planar mat is configured to interlock with a second planar mat comprising:
      i. at least one second mat edge gap;
      ii. at least one second mat edge lug comprising a second mat angled protrusion, and
   wherein the first mat and second mat are configured to be interlocked via:
      i. inserting the second mat angled protrusion into one of the first mat edge gaps and
      ii. urging one of the second mat edge lugs and second mat angled protrusion into alignment with one of the first mat edge lugs, such that the first angled protrusion is secured below the first slat on the first mat side of the at least one opening and the second mat angled protrusion is adjacently secured below the slat on the other side of the at least one opening such that the first angled protrusion and the second mat angled protrusion extend below the adjacent slats on opposite sides of the slat opening.

2. The slat cover of claim 1, wherein the first and second planar mats are rubber.

3. The slat cover of claim 2, wherein the rubber has a type A durometer of between 60 and 70.

4. The slat cover of claim 1, further comprising a plurality of raised buttons disposed on the first side of the first planar mat.

5. The slat cover of claim 4, wherein the plurality of raised buttons further comprise lower and upper buttons.

6. The slat cover of claim 1, further comprising a plurality of raised buttons disposed on the first side of the second planar mat.

7. The slat cover of claim 6, wherein the plurality of raised buttons further comprise lower and upper buttons.

8. An interlocking mat system for covering a slat having several internal and edge slat openings, the interlocking mat system comprising a plurality of planar rubber mats, each of the plurality of planar rubber mats comprising:
   a. at least one edge lug comprising a lug body and angled protrusion;
   b. at least one center lug; and
   c. at least one edge gap configured to receive an adjacent edge lug,
   wherein the plurality of planar rubber mats are configured such that first and second planar rubber mats are interlocked by:
      i. securing the first planar rubber mat atop a first slat such that the at least one edge lug angled protrusion is secured against the underside of the first slat;
      ii. inserting the at least one edge lug of the second planar rubber mat into the at least one edge gap of the first planar rubber mat and into space between the first slat and a second slat such that the at least one second mat edge lug is not aligned with the adjacent first mat edge lug in the space and edge gap and
      iii. urging the second mat edge lug into flush alignment with the adjacent first edge lug such that the first and second mat angled protrusions are secured on the undersides of adjacent slats and disposed toward opposite directions on the undersides of the first and second slats so as to secure the first and second mats to adjacent slats via the arrangement of the aligned edge lugs and the disposition of the angled protrusions under the slats.

9. The slat cover of claim 8, wherein the rubber has a type A durometer of between 60 and 70.

10. The slat cover of claim 8, further comprising a plurality of raised buttons disposed on the first side of the first planar mat.

11. The slat cover of claim 10, wherein the plurality of raised buttons further comprise lower and upper buttons.

12. The slat cover of claim 8, further comprising a plurality of raised buttons disposed on the first side of the second planar mat.

13. The slat cover of claim 12, wherein the plurality of raised buttons further comprise lower and upper buttons.

14. An interlocking slat cover system for use with adjacent livestock slats defining at least one opening therebetween, the interlocking slat cover system comprising:
   a. a first planar mat comprising:
      i. at least one first mat edge gap; and
      ii. at least one first mat edge lug comprising a first mat angled protrusion;
   b. a second planar mat comprising:
      i. at least one second mat edge gap;
      ii. at least one second mat edge lug comprising a second mat protrusion,
   wherein the first mat and second mat are configured to be interlocked via:
      i. placing the first planar mat atop a first slat such that the at least one first edge lug is disposed in the opening and the first mat angled protrusion is disposed below the first slat;
      ii. placing the second planar mat atop a second slat adjacent to the first slat such that the at least one second mat edge lug is in a first, unaligned position:
         A. in the opening defined between the first and second slats and
         B. unaligned with the at least one first edge lug;
      iii. urging the second mat angled protrusion below the second slat so as to be flush; and
      iv. sliding the at least one second mat edge lug into a second, unaligned position such that the first and second angled protrusions are secured on the undersides of the first and second slats via an interlocking connection.

15. The slat cover of claim 14, wherein the first and second planar mats further comprises at least one center lug.

16. The slat cover of claim 14, wherein the first and second planar mats are rubber.

17. The slat cover of claim 16, wherein the rubber has a type A durometer of between 60 and 70.

18. The slat cover of claim 14, further comprising a plurality of raised buttons disposed on the first side of the second planar mat.

19. The slat cover of claim 18, wherein the plurality of raised buttons further comprise lower and upper buttons.

* * * * *